United States Patent [19]

Tiggelbeck

[11] Patent Number: 4,840,651
[45] Date of Patent: Jun. 20, 1989

[54] GAS/SOLIDS CONTACTING DEVICE

[75] Inventor: Donald D. Tiggelbeck, Pittsburgh, Pa.

[73] Assignee: TIGG Corporation, Pittsburgh, Pa.

[21] Appl. No.: 142,569

[22] Filed: Jan. 11, 1988

[51] Int. Cl.⁴ .............................................. B01D 45/00
[52] U.S. Cl. ...................................... 55/479; 55/387; 55/512; 34/167; 422/177
[58] Field of Search ......... 55/74, 77, 98, 99, 387–389, 55/390, 479, 512, 478, 474; 34/167; 422/177, 190, 216

[56] References Cited

U.S. PATENT DOCUMENTS

| 4,340,400 | 7/1982 | Campanile et al. | 55/99 |
| 4,702,751 | 10/1987 | Leussler | 55/98 |
| 4,725,290 | 2/1988 | Ohlmeyer et al. | 55/77 |

FOREIGN PATENT DOCUMENTS

| 2239827 | 2/1974 | Fed. Rep. of Germany | 55/479 |
| 2605788 | 6/1977 | Fed. Rep. of Germany | 55/387 |
| 874136 | 10/1981 | U.S.S.R. | 55/387 |
| 2181073 | 10/1985 | United Kingdom | 55/387 |

*Primary Examiner*—Bernard Nozick
*Attorney, Agent, or Firm*—Harry B. Keck

[57] ABSTRACT

A gas/solids contacting device provides a light-weight, easily installed unit for contacting gases with particulate solids and permits the removal of spent solids and introduction of replacement solids. A solids contacting chamber is maintained between a pair of generally parallel foraminous surfaces which are inclined at an angle greater than the angle of repose of the particulate solids to be confined in the solids-containing chamber. The devices may be connected in parallel or in series and will function with the gas flowing upwardly or downwardly through a bed of particulate solids within the solids-containing chamber. Gas distributor means are provided to promote uniform low velocity gas flow through the solids bed. Retractable or removable support legs may be included.

5 Claims, 4 Drawing Sheets

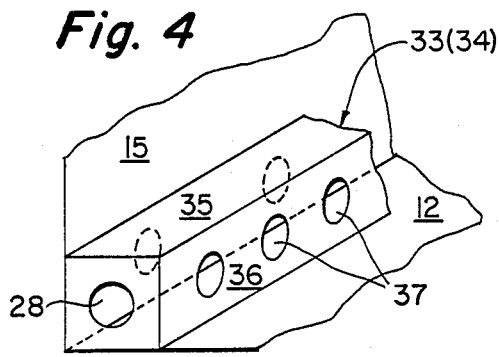
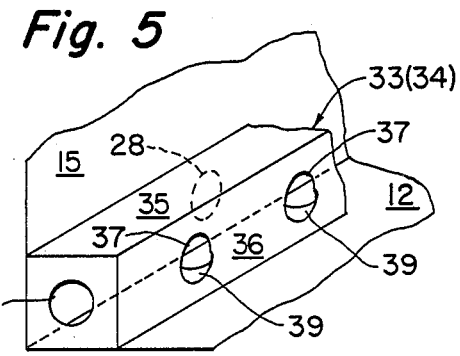
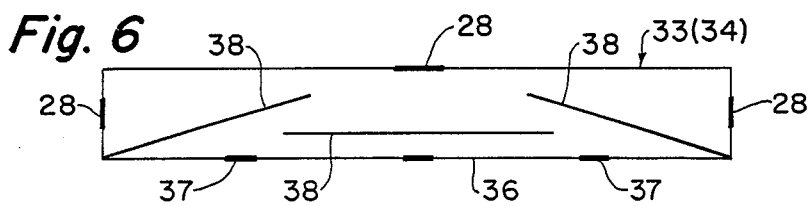
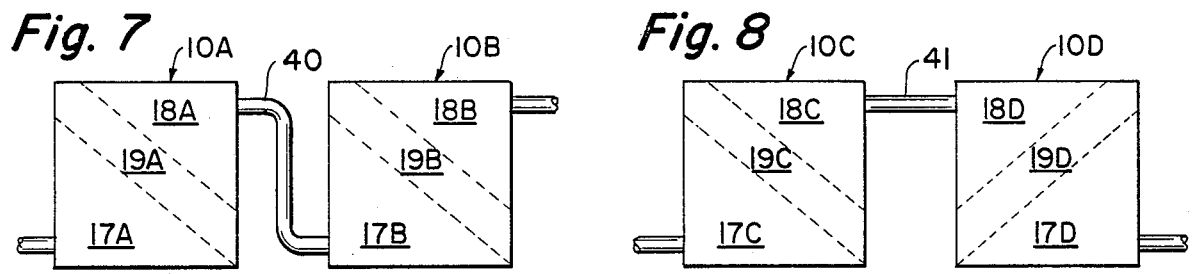
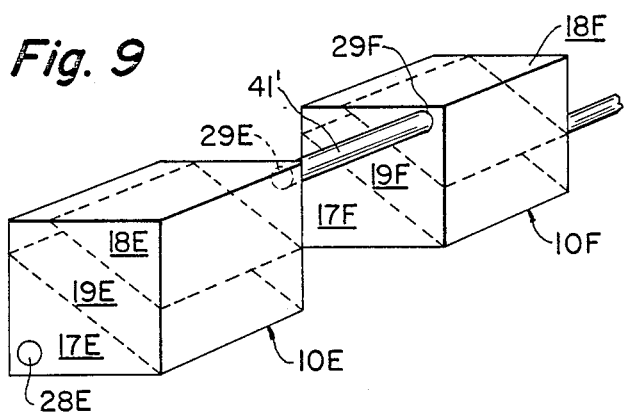
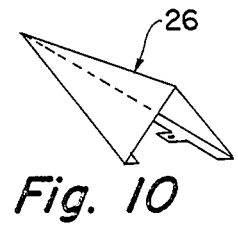

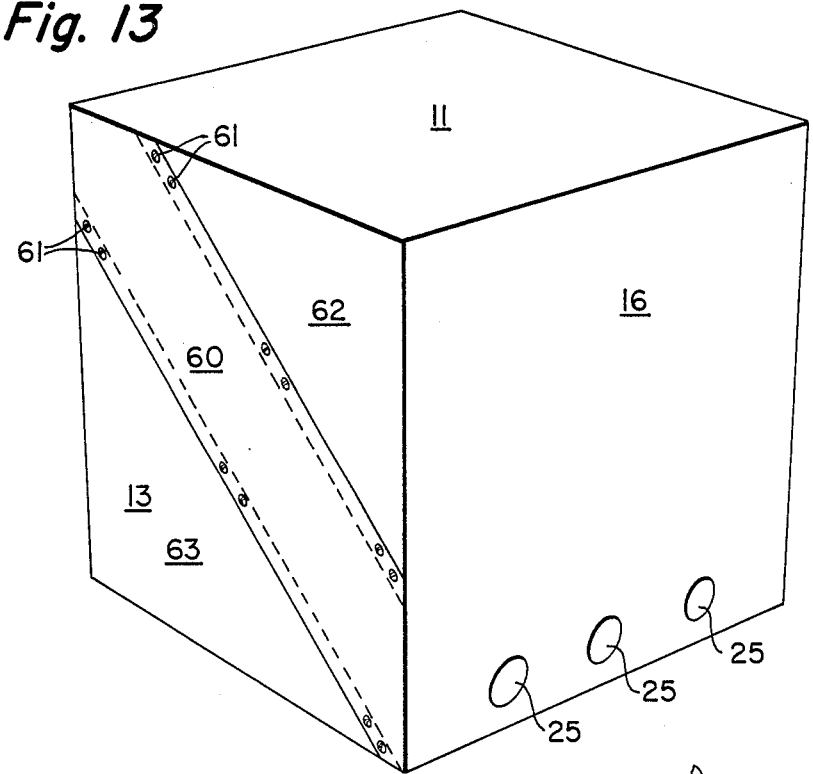
Fig. 13
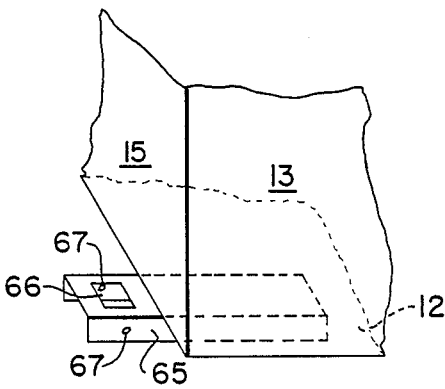
Fig. 14
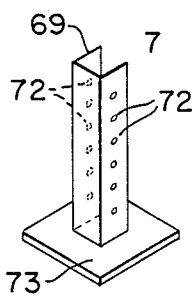
Fig. 16
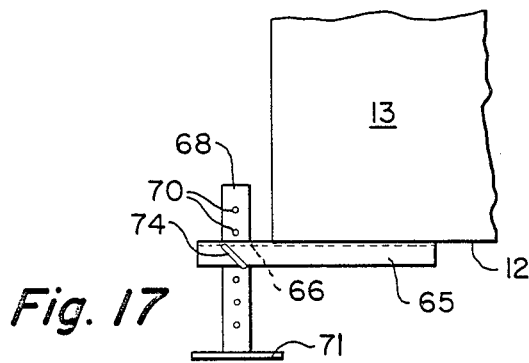
Fig. 15
Fig. 17

GAS/SOLIDS CONTACTING DEVICE

BACKGROUND OF THE INVENTION

1. Field of the Invention

This invention concerns a device in which gases can be contacted with solids and more particularly to a device in which the solids can be intermittently replaced in whole or in part.

2. Description of the Prior Art

There are numerous processes in which gases are contacted with particulate solids in order to alter the composition of the gas stream. Examples include contacting a gas stream with particulate solids functioning as a catalyst to promote reaction of gaseous ingredients; contacting the gases with an absorbent or an adsorbent to remove selected components from the gas stream, e.g., contacting a moisture-containing gas with a dessicant such as silica gel to remove moisture from the gas stream, or contacting an acidic stream with alkaline solids to remove acid-containing ingredients from the gas stream, or contacting a stream with organic contaminants to remove the organic contaminants by contacting the gas stream with particulate activated carbon. There are other known processes for contacting gases with particulate solids in order to bring about desired changes in the composition of the particulate solids. The present invention is applicable to all such processes but is of particular interest to those processes where gases are treated by the solids to remove certain ingredients (moisture, acidic ingredients, organic ingredients) from the gas stream.

Gas solids containing devices are known wherein a moving bed of particulate treating solids passes between screens, louvers or other gas permeable surfaces whereby the gas stream flows counter to or transversely to the direction of solids movement. The solids movement may be continuous or intermittent according to various processes known in the art.

STATEMENT OF THE PRESENT INVENTION

The present invention is concerned with a gas/solids contacting device confined within a portable container which provides for transverse gas movement through a static bed of particulate solids. The bed of solids is confined between generally parallel inclined foraminous surfaces which permit withdrawal and replacement of the particulate solids treating materials intermittently. The units may be provided in a range of sizes to accommodate the needs of a particular gas treatment installation. The units can be conveniently connected in parallel to increase capacity and can be connected in series to increase the efficiency of the gas/solids contacting process.

One aspect of the invention is to provide the aforementioned inclined foraminous surfaces at an angle which is greater than the angle of repose of the particulate solids which form the treatment bed. By providing the foraminous surfaces at an angle greater than the angle of repose of the particulate solids, the solids may be readily withdrawn from the bed between the foraminous surfaces by opening appropriate discharge ports at the base of the particulate solids bed. In a preferred embodiment, the bed is provided with multiple discharge ports and is further provided with wedge-shaped flow directing guides to facilitate complete removal of the particulate solids when desired. At least one inlet port is provided for introducing fresh or regenerated treatment solids into the solids bed. Multiple inlet ports are preferred to facilitate uniform filling of the particulate solids bed.

The particulate solids bed is confined within a generally rectangular casing which has a plenum chamber above and a plenum chamber below the particulate solids bed. Openings are provided into each plenum chamber to admit untreated gas into one of the plenum chambers and to discharge treated gas from the other of the plenum chambers.

As a further improvement, either or both of the plenum chambers may be provided with a gas distribution manifold which attenuates and uniformly divides the forces of gas introduction and achieves a nearly uniform flow of incoming gas into one of the gas plenum chambers for uniform transit through the particulate solids bed. The distributor box preferably is provided with appropriate baffles and multiple gas outlets. A similar collection manifold reverses the procedure in the outlet plenum, to further promote uniform flow through the particulate solids bed.

DESCRIPTION OF THE DRAWINGS

FIGS. 4 and 5 are perspective illustrations of gas distribution boxes of the type illustrated in FIG. 3.

FIG. 6 is a plan view of a gas distribution box of FIGS. 4 or 5 illustrating the location of baffle elements.

FIGS. 7 and 8 are schematic side elevation illustrations of the serial connection of two of the present gas/solids contact devices.

FIG. 9 is a perspective illustration of the serial connection of two gas/solids contact devices.

FIG. 10 is a perspective illustration of a solids flow directing element.

FIG. 13 is a perspective illustration of an alternative embodiment of the device of FIG. 1 showing a removable side wall cover plate.

FIG. 14 is a fragmentary perspective illustration of a bottom corner of the device of FIG. 1 showing an alternative mounting plate.

FIGS. 15 and 16 are perspective illustrations of alternative constructions for supporting legs to function with the mounting plate of FIG. 14.

FIG. 17 is a fragmentary side elevation of a bottom corner of a device of FIG. 1 showing the mounting elements of FIGS. 14 and 15 (or 16) in operating relationship.

DESCRIPTION OF THE PREFERRED EMBODIMENTS

One of the preferred applications for the present gas/solids contacting device is passing gases through a bed of activated carbon for selective removal of organic ingredients contained in the gas.

Figure 1:
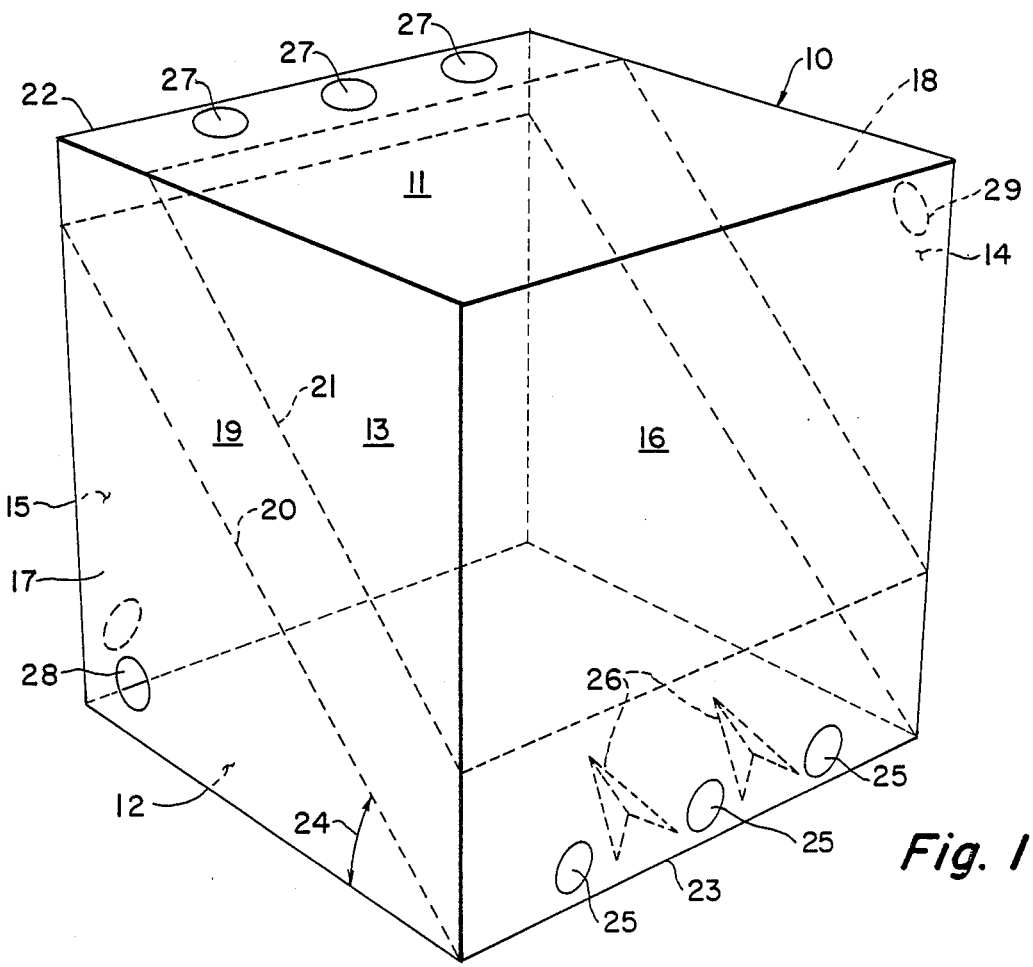
FIG. 1 is a perspective illustration of a solids contact device of the present invention.

FIG. 1 illustrates the present gas/solids contact device comprising a box 10 containing a top wall 11, bottom wall 12, side walls 13, 14 and end walls 15, 16. The box 10 contains three distinct chambers including a gas manifold chamber 17, a gas manifold chamber 18 and a solids-containing intermediate chamber 19. The solids-containing intermediate chamber 19 is confined between a pair of foraminous surfaces 20, 21 which comprise essentially flat surfaces having openings sufficiently small to preclude any significant passage of solid materials through the surface but admitting free passage of gases through the surfaces.

The top foraminous surface 21 extends from the one side wall 13 to the other side wall 14 and commences along the top wall 11 adjacent to the intersection 22 of the top wall 11 and the end wall 15. The foraminous surface 21 extends to the end wall 16 above the intersection 23 of the end wall 16 and the bottom wall 12. The bottom foraminous surface 20 likewise extends from the side wall 13 to the side wall 14 and extends from the back wall 15 adjacent to and below the intersection 22 toward the intersection 23 of the bottom wall 12 and the end wall 16. As illustrated in FIG. 1, the bottom foraminous surface 20 terminates exactly at the intersection 23. In other embodiments, the termination of the bottom foraminous surface 20 could be along the bottom wall 12 or along the end wall 16 in the region of the intersection 23.

It will be observed that the angle of inclination, indicated by the numeral 24, between the bottom wall 12 and the foraminous surface 21 is at least equal to the angle of repose of the solid material which will be deposited in the intermediate solids-containing chamber 19. For activated carbon having a particle size from 2 to 50 U.S. Sieve, the angle of repose is about 30 degrees for dry material, about 25–35 degrees for visibly moist material, depending on the amount of liquid between particles.

The end wall 16 is equipped with one or more outlet ports 25 through which spent treatment solids can be removed from the solids-containing chamber 19. In a preferred embodiment, flow directing devices 26 are positioned in the solids-containing chamber 19 to direct the spent treatment solids into the ports 25. The flow directing devices 26, which are illustrated in FIG. 10, also reduce the volume of non-functioning contacting-solids within the solids-containing chamber 19. Solids inlet ports 27 are provided in the top wall 11 to admit treatment solids into the solids-containing chamber 19. Appropriate closure members (not shown in FIG. 1) are provided for the outlet ports 25 and the inlet ports 27. With the bottom in a generally horizontal plane, spent solids will readily flow out from the solids-containing chamber 19 so long as the angle 24 exceeds the angle of repose of the solids.

The box 10 is provided with one or more gas flow ports 28 communicating with the plenum chamber 17 and one or more gas flow ports 29 communicating with the plenum chamber 18. In operation the gas/solids contacting device 10 receives gas to be treated through a gas flow port 28. The gases passes through the solids-containing chamber 19 where it encounters the treatment solids; the treated gas is recovered from the plenum chamber 18 through the gas flow port 29. It is possible to reverse the flow so that the gas to be treated enters the gas flow port 29 and passes from the plenum chamber 18 through the solids-containing chamber 19 into the plenum chamber 17 and out through a gas flow port 28.

Figure 2:
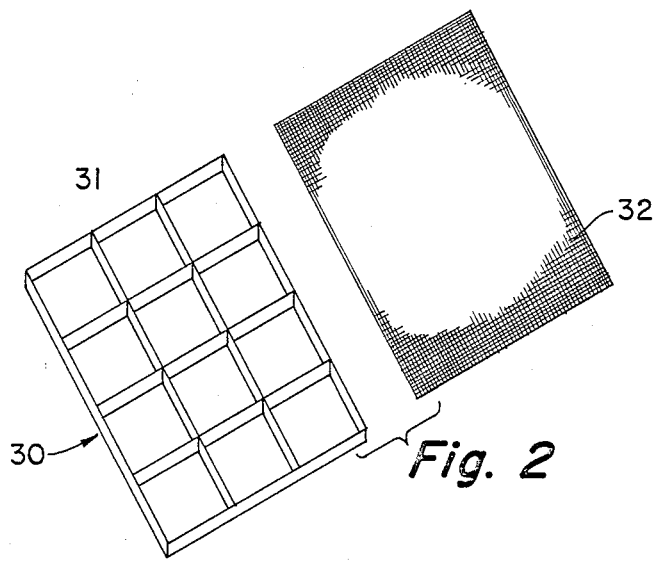
FIG. 2 is a perspective illustration of a structural grid and screen which combine as a foraminous surface.

As thus far described, the present gas/solids contact device can be quickly installed where needed and can be easily serviced by removing spent treatment solids and replacing fresh treatment solids in the solids-containing chamber 19. The units can be fabricated in generally rectangular configuration of sufficient sizes to meet normally anticipated gas flow conditions. Easily handled boxes 10 can be fabricated as cubes with edges of 2 feet by 2 feet by 2 feet up to 5 feet by 5 feet by 5 feet for rapid installation. The outer surfaces of the box 10 preferably are fabricated from light gauge metals such as steel sheets of 20 gauge through 10 gauge. The foraminous surfaces 20, 21 are preferably formed as illustrated in FIG. 2 wherein a sturdy grating 30 is formed from perpendicularly presented ribs 31 in the form of a "subway grating". The grating 30 is covered with appropriate screen, mesh, fabric or other foraminous surface 32, preferably stainless steel wire mesh. The screen 32 will be presented on the interior surface of the solids-containing chamber 19.

Figure 3:
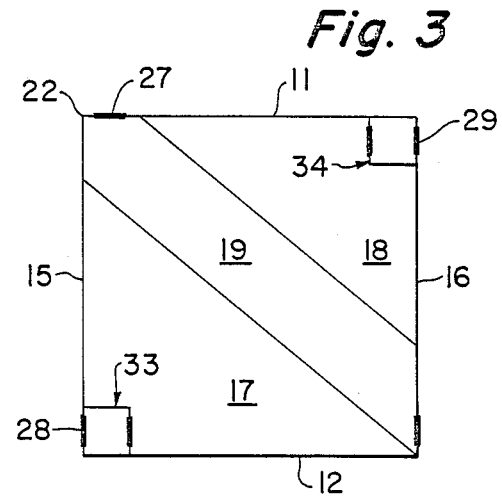
FIG. 3 is a sectional view of the solids contact device of FIG. 1.

A further improvement of the present gas/solids contacting device is illustrated schematically in FIG. 3 having corresponding numerals and illustrating gas distribution housings 33, 34 which are presented in the plenum chambers 17, 18 respectively. The purpose of the gas distribution housings 33, 34 is to attenuate the force component of gases and retard any flow channeling tendencies within the plenum chambers 17, 18, without inducing significant flow resistance.

One gas distribution housing element 33 (34) is illustrated in FIG. 4 as having a top surface 35 and a side surface 36. Gas flow ports 28 introduce gas into the interior of the distribution housing 33 whence multiple gas flow ports 37 communicate with the plenum chamber 17 to distribute incoming gas uniformly. In a preferred embodiment, the interior of the gas distribution housing 33 (34) may be provided with appropriate sheet baffles as illustrated in FIG. 6. The incoming gas enters through one or more gas flow ports 28 and encounters overlapping baffle surfaces 38 and exit from the gas distribution housing through gas flow ports 37 at a uniform velocity.

Another feature of the gas distribution housing 33 (34) illustrated in FIG. 5 provides curved surfaces 39 on the plenum chamber side of the gas ports 37 to intercept force components of the gas and further diminish turbulence within the plenum chamber.

The present gas/solids contacting device can be employed with gas flow in either direction with housings 33, 34 acting to distribute/collect or collect/distribute gases. Accordingly the units can be conveniently assembled in series for optimum recovery efficiency as illustrated in FIGS. 7, 8, 9. In FIG. 7, the two devices 10A, 10B function identically. Incoming gases enter the plenum chamber 17A and are exhausted from the plenum chamber 18A through a conduit 40 into a plenum chamber 17B. Treated gases are withdrawn from the plenum chamber 18B. In FIG. 7, the gas flow is upwardly through both of the solids-containing chambers 19A, 19B.

In FIG. 8, incoming gases enter the device 10C through the plenum chamber 17C and are withdrawn from the plenum chamber 18C through a conduit 41 to the plenum chamber 18D of the device 10D. Treated gases are withdrawn from the device 10D from the plenum chamber 17D. In the arrangement shown in FIG. 8, the gases flow upwardly through the solids-containing chamber 19C and flow downwardly through the solids containing chamber 19D.

FIG. 9 presents the same flow arrangement as that illustrated in FIG. 8 except that the gases are introduced and withdrawn through side walls instead of end walls. The gas enters the device 10E through gas flow port 28E and is delivered by a circuit 41' to the device 10F whence the treated gas is withdrawn from the plenum chamber 17F through a conduit (not shown).

FIGS. 7, 8, 9 collectively illustrate the versatility of the present gas/solid contacting device and its ability to provide substantial gas-solids contact time in relatively small space.

The present gas/solids containing devices can be connected in parallel to increase the throughput of any installation and thereby avoid the need for oversize units to achieve a desired low gas velocity through the solids-containing chambers 19.

Typically the solids-containing chambers 19 will have a thickness (distance between the two foraminous surfaces 20, 21) of about 10 to 30 inches.

Figure 11:
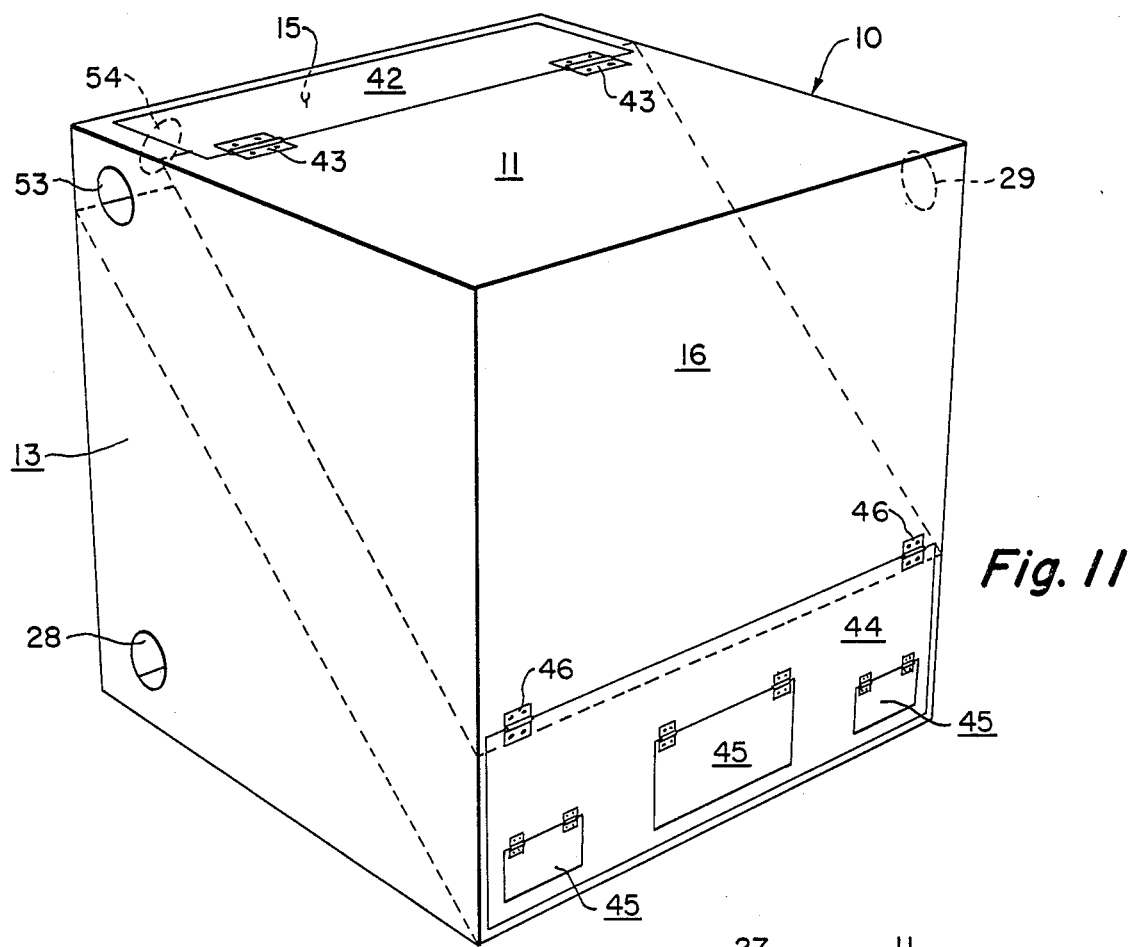
FIG. 11 is a perspective illustration of a gas/solids contact device showing hinged openings for introducing and for withdrawing contact solids.

Alternative solids feed and discharge devices are illustrated in FIG. 11. FIG. 11 is a perspective illustration of an alternative embodiment of the present invention illustrating a hinged cover 42 in the top wall 11 of the device. Hinges 43 permit the hinged cover 42 to expose the interior of the solids-containing chamber 19 for rapid introduction of fresh treating solids into the solids chamber 19.

The device 10 shown in FIG. 11 also provides one or more hinged openings 44, 45 in the end wall 16 for removing spent treating solids from the solids-containing chamber 19. A large hinged cover 44 may be pivoted through hinges 48 to open an area in the end wall 16 which communicates the solids-containing chamber 19 for rapid removal of spent solids. Alternatively, smaller hinged covers 45 may be opened individually or together to discharge spent solids. The device 10 of FIG. 11 also may be filled through a port 53 in side wall 13 or a port 54 in the end wall 15.

Figure 12:
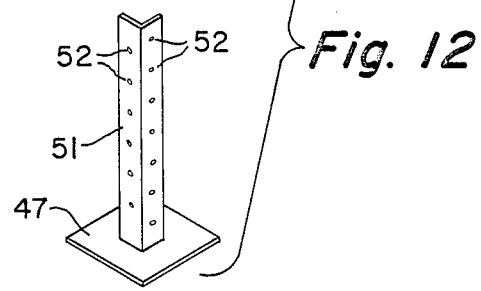
FIG. 12 is a perspective illustration of a bottom corner of the device of FIG. 1 showing a supporting leg connected to a corner of a gas/solids contact device.

A further feature of the present invention is illustrated in FIG. 12 wherein the device may be equipped with convenient leg members 51 formed from an angle strip having multiple openings 52 and having a base plate 47. This side wall 13 and end wall 15 join in an edge 48. Appropriate brackets 49 are secured to the walls 13, 15 respectively to provide a slide connection for receiving the leg member 51. One or more pin receiving opening 50 is provided in the walls 13 and/or 15 to receive a pin or threaded fastener to secure the leg member 51 at a selected elevation within the brackets 49. During shipment, the leg member 51 will be positioned such that the base plate 47 does not significantly protrude from the box during shipment.

A further alternative embodiment of the device is illustrated in FIG. 13 wherein the side wall 13 of the device is formed from a pair of triangular plates 62, 63 and a cover plate 60 which is secured by fasteners such as screws 61 to the triangular plates 62, 63. The removable cover plate 60 facilitates cleaning the interior of the device. Appropriate gasketing is provided between the cover plate 60 and the mounting seams to preclude gas entry or discharge through the seams. By removing the cover plate 60, the operator can have access to the screens and grating elements within the device for maintenance if required.

FIGS. 14, 15, 16 and 17 illustrate an alternative construction for supporting legs to elevate the device above a base surface. As shown in FIG. 14, a lower corner of the device is formed from a side wall 13, an end wall 15 and a bottom wall (not seen) 12. A length of channel 65 is secured to the bottom wall 12 in any appropriate fashion as by welding, bolting, et cetera. The channel 65 has a generally square cut-out 66 in its flange and is provided with a pin-receiving opening 67 in the channel legs. The supporting legs can be a rectangular cross-section tube 68 (FIG. 15) or a channel 69 (FIG. 16). The leg 68 of FIG. 15 is provided with pin-receiving openings 70 and is secured to a base plate 71. The leg 69 of FIG. 16 is provided with pin-receiving openings 72 in its channel legs and is secured to a base pad 73. The assembly of the supporting structure is illustrated in FIG. 17 wherein the leg member 68 is inserted through the flange opening 66 of the channel 65. A pin 74 is inserted through aligned opening 66 (of the channel 65) and 70 (of the leg 68). Leg members as shown in FIGS. 14, 15, 16 and 17 can be employed not only at the corners of the device but also, if desired at spaced locations along one or more edges of the bottom wall 12. The channels 65 can extend entirely across the width of the bottom wall and function as skids for the device.

Figure 18:
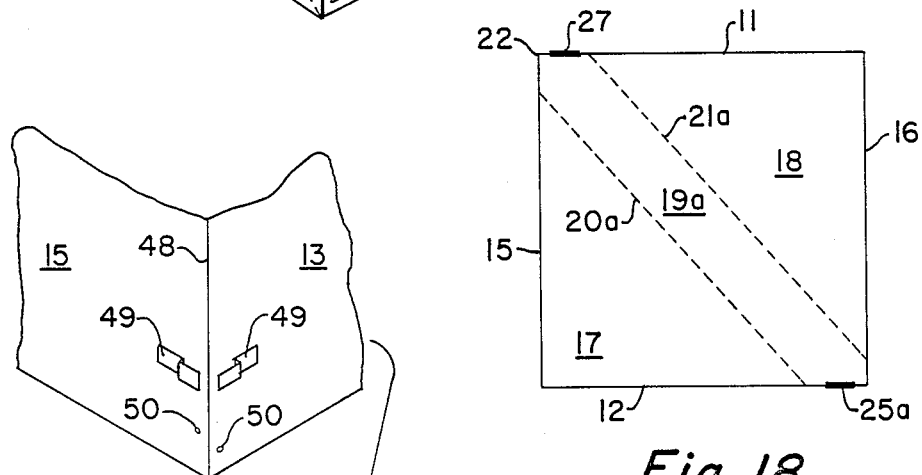
FIG. 18 is a sectional view, similar to FIG. 3, of an alternative embodiment of a solid contact device similar to that illustrated in FIG. 1.

A further alternative embodiment of the present invention is illustrated in FIG. 18 which is similar to FIG. 3 except that the lower foraminous sheet 20a intersects the bottom wall 12 and one or more discharge ports 25a is provided in the bottom wall 12. In the embodiment of FIG. 18, solids which are introduced into the chamber 19a may be discharged through the bottom wall discharge port 25a. The design also permits a steeper angle of the foraminous sheets 20a, 21a.

SUMMARY

The present invention provides a light-weight, portable, gas/solids containing device which can be quickly and conveniently filled, emptied and refilled with treatment solids. A preferred treatment solid is activated carbon. However other solids may be employed such as catalysts, dewatering agents, molecular sieves and other gas treating materials. The foraminous surfaces which define the solids-containing chamber are presented at an inclination angle which exceeds the angle of repose of the particular solids to be contained in the chamber, thus facilitating charging and removing treatment solids.

I claim:

1. A container for contacting gases with particulate solids comprising a generally rectangular box having a top wall a bottom wall, two side walls and a first end wall and a second end wall opposite the said first end wall, said container including therein a solids-containing chamber formed between a pair of generally parallel foraminous surfaces which are generally perpendicular to said side walls; an upper one of said foraminous surfaces extending from the said top wall adjacent to the intersection of the said top wall with said first end wall to the said second end wall adjacent to the intersection of said bottom wall with said second end wall; a lower one of said foraminous surface extending from said first end wall adjacent to the intersection of said top wall with said first end wall to the region of the intersection of said bottom wall with said second end wall;

at least one solids charging opening communicating with said chamber in the said top wall or said first end wall or either side wall for introducing particulate solids into said solids-containing chamber; at least one solids discharge opening in the said second end wall or bottom wall, said opening communicating with said solids-containing chamber for discharging particulate solids from said solids-containing chamber; at least one gas flow port in said container beneath the said solids-containing chamber to admit gas into or to discharge gas from said container; at least one gas flow port in the said container above the said solids-containing chamber to discharge gas from or to admit gas into said container; said solids-containing chamber containing particulate solids between the said foraminous surfaces and being adapted to permit the flow of gas from a first said gas flow port, through a first of said foraminous surfaces, through the contained particulate solids and through the second of said foraminous surfaces, and through a second said gas flow port; said foraminous surfaces being inclined at an angle greater than the angle of repose of said particulate solids;

said container including a gas distribution means comprising multiple baffles defining multiple gas passageways between said first gas flow port and the said first of said foraminous surfaces, said baffles preventing unidirectional flow of gas from the said first gas flow port to said first of said foraminous surfaces.

2. A container for contacting gases with particulate solids comprising a generally rectangular box having a top wall a bottom wall, two side walls and a first end wall and a second end wall opposite the said first end wall, said container including therein a solids-containing chamber formed between a pair of generally parallel foraminous surfaces which are generally perpendicular to said side walls; and upper one of said foraminous surfaces extending from the said top wall adjacent to the intersection of the said top wall with said first end wall to the said second end wall adjacent to the intersection of said bottom wall with said second end wall; a lower one of said foraminous surfaces extending from said first end wall adjacent to the intersection of said top wall with said first end wall to the region of the intersection of said bottom wall with said second end wall;

at least one solids charging opening communicating with said chamber in the said top wall or said first end wall or either side wall for introducing particulate solids into said solids-containing chamber; at least one solids discharge opening in the said second end wall or bottom wall, said opening communicating with said solids-containing chamber for discharging particulate solids from said solids-containing chamber; at least one gas flow port in said container beneath the said solids-containing chamber to admit gas into or to discharge gas from said container; at least one gas flow port in the said container above the said solids-containing chamber to discharge gas from or to admit gas into said container; said solids-containing chamber containing particulate solids between the said foraminous surfaces and being adapted to permit the flow of gas from a first said gas flow port, through a first of said foraminous surfaces, through the contained particulate solids and through the second of said foraminous surfaces, and through a second said gas flow port; said foraminous surfaces being inclined at an angle greater than the angle of repose of said particulate solids;

wherein the said solids-charging opening is generally rectangular and extending substantially entirely across the said top wall, and hinged plate covering said solids-charging opening.

3. A container for contacting gases with particulate solids comprising a generally rectangular box having a top wall a bottom wall, two side walls and a first end wall and a second end wall opposite the said first end wall, said container including therein a solids-containing chamber formed between a pair of generally parallel foraminous surfaces which are generally perpendicular to said side walls; an upper one of said foraminous surfaces extending from the said top wall adjacent to the intersection of the said top wall with said first end wall to the said second end wall adjacent to the intersection of said bottom wall with said second end wall; a lower one of said foraminous surfaces extending from said first end wall adjacent to the intersection of said top wall with said first end wall to the region of the intersection of said bottom wall with said second end wall;

at least one solids charging opening communicating with said chamber in the said top wall or said first end wall or either side wall for introducing particulate solids into said solids-containing chamber; at least one solids discharge opening in the said second end wall or bottom wall, said opening communicating with said solids-containing chamber for discharging particulate solids from said solids-containing chamber; at least one gas flow port in said container beneath the said solids-containing chamber to admit gas into or to discharge gas from said container; at least one gas flow port in the said container above the said solids-containing chamber to discharge gas from or to admit gas into said container; said solids-containing chamber containing particulate solids between the said foraminous surfaces and being adapted to permit the flow of gas from a first said gas flow port, through a first of said foraminous surfaces, through the contained particulate solids and through the second of said foraminous surfaces, and through a second said gas flow port; said foraminous surfaces being inclined at an angle greater than the angle of repose of said particulate solids;

tapered flow diverting members, positioned in the said solids-containing chamber adjacent to and between adjoining solids discharge openings to divert the flow of spent treatment solids toward said discharge openings and avoid accumulation of nonfunctional gas treatment solids.

4. A container for contacting gases with particulate solids comprising a generally rectangular box having a top wall a bottom wall, two side walls and a first end wall and a second end wall opposite the said first end wall, said container including therein a solids-containing chamber formed between a pair of generally parallel foraminous surfaces which are generally perpendicular to said side walls; an upper one of said foraminous surfaces extending from the said top wall adjacent to the intersection of the said top wall with said first end wall to the said second end wall adjacent to the intersection of said bottom wall with said second end wall; a lower one of said foraminous surfaces extending from said first end wall adjacent to the intersection of said top wall with said first end wall to the region of the intersection of said bottom wall with said second end wall;

at least one solids charging opening communicating with said chamber in the said top wall or said first end wall or either side wall for introducing particulate solids into said solids-containing chamber; at least one solids discharge opening in the said second end wall or bottom wall, said opening communicating with said solids-containing chamber for discharging particulate solids from said solids-containing chamber; at least one gas flow port in said container beneath the said solids-containing chamber to admit gas into or to discharge gas from said container; at least one gas flow port in the said container above the said solids-containing chamber to discharge gas from or to admit gas into said container; said solids-containing chamber containing particulate solids between the said foraminous surfaces and being adapted to permit the flow of gas from a first said gas flow port, through a first of said foraminous surfaces, through the contained particulate solids and through the second of said foraminous surfaces, and through a second said gas flow port; said foraminous surfaces being inclined at an angle greater than the angle of repose of said particulate solids;

mounting elements extending outwardly from the bottom of the container, a supporting leg for each said mounting element, and means for engaging the said leg with the said mounting element.

5. The container of claim 4 wherein spaced, aligned pin-receiving openings are provided in the said supporting leg and wherein each said mounting element has a rectangular cut-out for receiving a said supporting leg and has aligned pin-receiving openings and a pin for securing the said supporting leg to the mounting element by engagement with aligned pin-receiving openings.

* * * * *